Sept. 30, 1941.  C. A. SCHULZ  2,257,622
SPARK PLUG TESTER
Filed Jan. 14, 1941  2 Sheets-Sheet 2
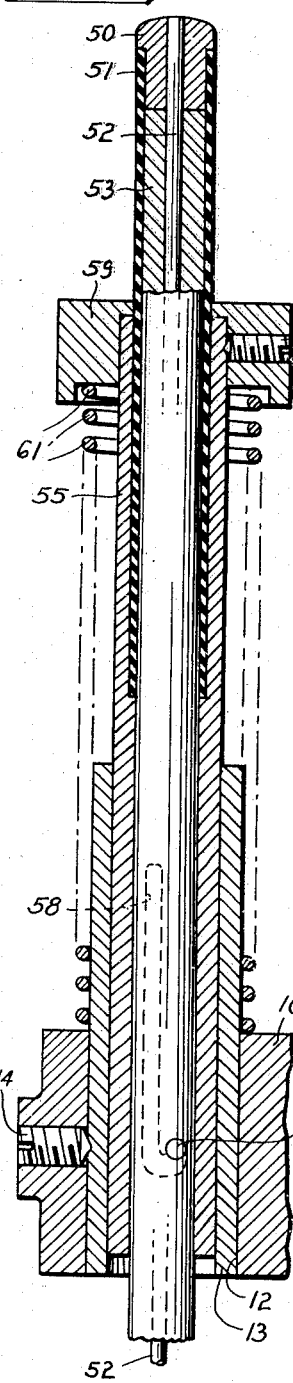
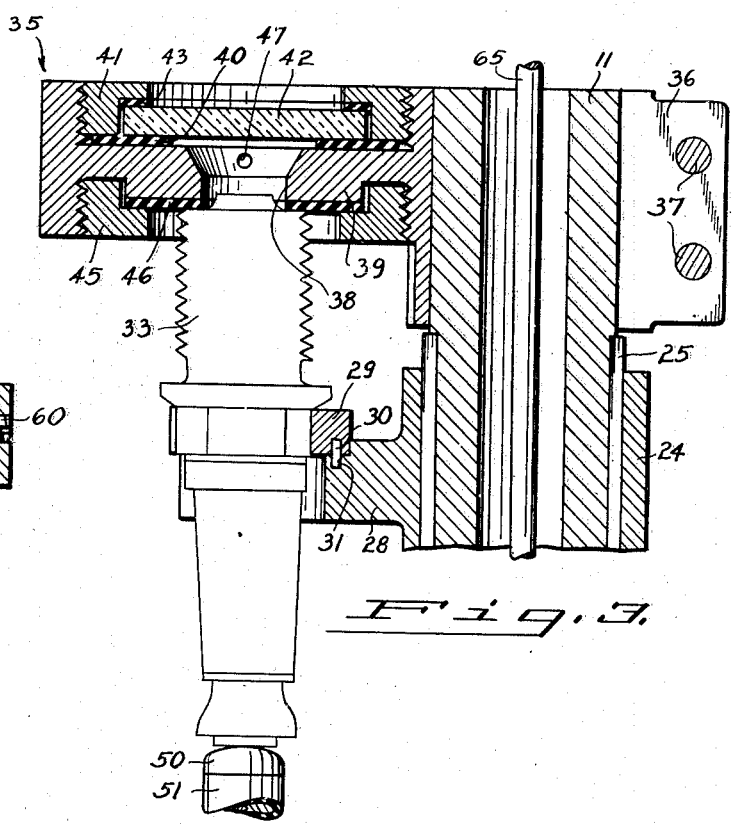
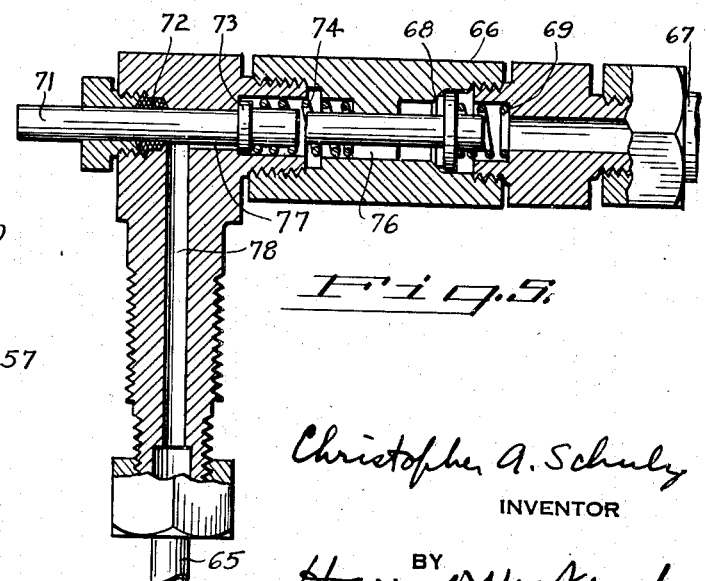
Christopher A. Schulz
INVENTOR
BY Harry H. Yerkes
ATTORNEY Patented Sept. 30, 1941

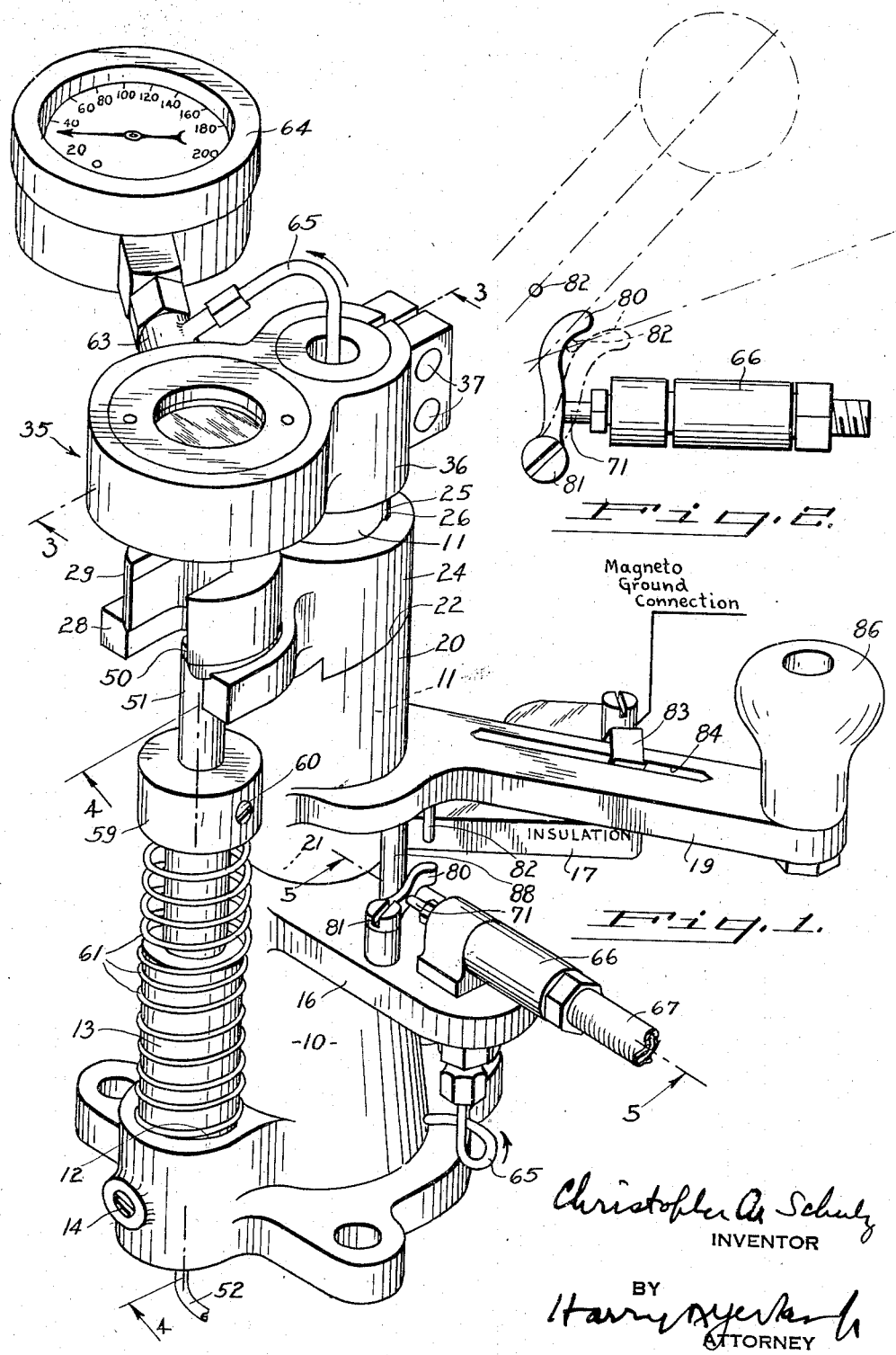

2,257,622

UNITED STATES PATENT OFFICE 2,257,622

SPARK PLUG TESTER

Christopher A. Schulz, Guttenberg, N. J., assignor to The B. G. Corporation, New York, N. Y., a corporation of New York Application January 14, 1941, Serial No. 374,307

12 Claims. (Cl. 175—183)

This invention relates to apparatus for testing spark-plugs by operating them while under super-atmospheric pressure such as encountered in an engine cylinder.

In such apparatus it has been customary to provide a pressure chamber with an opening that is closed by the spark-plug which is to be tested. The part of the plug that will be exposed to the cylinder compression is thus exposed to the pressure in the chamber. The plug is connected with a magneto or other source of high tension electricity, and there is a window in the chamber through which the operation of the plug can be observed.

It is an object of this invention to provide an improved spark-plug tester, and it is a more particular object to provide a simplified tester in which the positioning of the spark-plug, the supply of gas to the pressure chamber, and the power supply to the plug are all operated by the movement of a single control handle.

One feature of the invention relates to cam mechanism for positioning the plug and opening the gas supply valve for the pressure chamber in the desired sequence. One advantage of the cam mechanism is that it provides a practical construction for manual operation and simplifies the apparatus as compared with earlier constructions where fluid motors were used for the operations that are performed by cam mechanisms in this invention.

The invention comprises novel features and combinations of elements that make the tester economical to manufacture and convenient and advantageous in use. The convenience with which a spark-plug tester can be used is particularly important inasmuch as it determines in large measure the number of plugs that can be tested in any given period, and consequently the cost of the testing.

Other objects, features, and advantages of the invention will appear or be pointed out as the specification proceeds.

In the accompanying drawings, forming a part hereof:

Fig. 1 is a perspective view of a spark-plug tester embodying this invention.

Fig. 2 is a top plan detail view showing the way in which the valve is operated.

Figs. 3–5 are enlarged sectional views taken on the lines 3—3 to 5—5 of Fig. 1, and with a spark-plug in position to be tested in Fig. 3.

A base 10 has an upwardly extending post 11, and a socket 12 in which a bearing sleeve 13 is held by a set screw 14. There are two supports 16 and 17 extending from the base 10. The support 16 is preferably integral with the base 10, but the support 17 is made of electric insulating material, such as Tenite, and is fastened to a boss on one side of the base.

A crank 19 extends from a hub 20 that fits the post 11. The lower end of the hub 20 rests on a bearing surface 21 of the base 10. This bearing surface 21 serves as a thrust bearing not only for supporting the weight of the hub 20 and its connected parts, but also for the reaction from a cam 22 at the upper end of the hub 20.

The cam 22 is in the form of a number of inclined planes similar to ratchet teeth. A hub 24 with complementary cam surfaces at its lower end comprises the cam follower. The crank 19 and hub 20 have a limited oscillatory movement on the post 11, but keys 25 on opposite sides of the post 11 fit into keyways 26 in the hub 24 and prevent that hub from turning on the post 11. The keys 25 are a running fit in the keyways 26 so that the hub 24 is free to slide up and down on the post 11. Forward, or clockwise, movement of the crank 19 causes the cam 22 to thrust the hub 24 upward.

A platform 28 extends out from one side of the hub 24. An adapter 29 fits into a recess in the top surface of the platform 28 and the adapter is held in a definite position by studs 30 (Fig. 3) on the adapter that extend into openings 31 in the platform.

There is a slot in the adapter 29 and a spark-plug 33 (Fig. 3) is pushed into the slot upside-down and positioned with the flange at the end of the shell threads resting on the adapter 29 as shown in Fig. 3. For wider spark-plugs a different adapter with a wider slot is used in place of the adapter 29. For narrower plugs an adapter with a narrower slot is used. The slot in the platform 28 is wide enough to accommodate the widest spark-plug with which the tester is intended to be used. Variations in the length of spark-plug shells can be compensated for by using thicker or thinner adapters.

At the upper end of the tester there is a housing 35 that has a split clamp 36 at one side for fastening the housing to the post 11. The clamp 36 is closed to grip the upper end of the post 11 by screws 37.

Within the housing 35 there is an opening 38 through a partition 39 and there are threaded recesses both above and below the partition 39. A gasket 40 is clamped against the top surface of the partition 39 by a ring 41 that threads into the upper recess in the housing 35. A flange of the ring 41 clamps a transparent window 42 against the gasket 40, and there is a small annular gasket 43 between the window and the flange of the ring 41. The window is preferably glass and is heavy enough to withstand the pressure in the chamber below it. The gaskets are preferably rubber.

A ring 45 threaded into the lower recess in the housing holds a rubber facing 46 against the lower surface of the partition 39. The space under the window 42 and within the opening 38 is the pressure chamber of the tester. Gas under pressure is supplied to this chamber through a passage 47 through the side of the housing 35.

The spark-plug 33 is shown in position to be tested. The end of the spark-plug shell is against the rubber facing 46 and held against that facing with sufficient pressure to prevent leakage of gas. The electrodes and the interior of the spark-plug are exposed to the pressure of the gas within the chamber just the same as if the plug were threaded into a wall of the chamber.

Power is supplied to the spark-plug 33 through a metal button 50 that is held against the terminal of the spark-plug by spring pressure. The button 50 is at the top of a sleeve 51 (Fig. 4) which is made of fiber or other electrical insulating material. A wire 52 is connected to the button 50 and surrounded below the button by insulation 53. The wire 52 passes through the socket 12 in the base 10 and then to a magneto or other source of high tension electricity.

The lower end of the fiber sleeve 51 is held securely in a tube 55, and the tube 55 is vertically movable in the bearing sleeve 13 as a guide. The vertical movement is limited, however, by a stud 57 extending from the tube 55 into a slot 58 in the bearing sleeve 13. A collar 59 is fastened to the upper end of the tube 55 by a set screw 60, and the tube 55 is urged upward by a spring 61 compressed between the collar 59 and the base 10. In Fig. 4 the tube 55 is in its lowered position in which it is held by rotating it slightly to bring the stud 47 into the undercut stop at the lower end of the slot 58.

Gas is supplied to the pressure chamber through a fitting 63 that threads into a wall of the housing 35 and communicates with the passage 47 (Fig. 3) leading into the pressure chamber. A gauge 64 (Fig. 1) is connected to one end of the fitting 63 and a branch connection joins the fitting 63 with tubing 65 that extends through the hollow interior of the post 11 and then through the base 10 near its lower end. The tubing 65 connects with a valve casing 66 secured to the support 16. A hose 67 connects the inlet end of the valve casing 66 with a cylinder of compressed gas or other source of gas under pressure. Compressed air can be used, but carbon dioxide is preferable.

The internal construction of the valve casing and the enclosed parts are shown in Fig. 5. Just beyond the inlet there is a valve 68 that is normally closed and held against its seat by a spring 69. A plunger 71 slides in a portion of the valve casing and extends from one end of the casing through a stuffing-box 72. A shoulder 73 on the plunger 71 limits its travel toward the left in Fig. 5, and a spring 74 urges the plunger into the position shown in Fig. 5. In this position there is some play or lost motion between the end of the plunger 71 and the adjacent end of the stem of valve 68.

The valve 68 fits freely enough in its housing for gas to escape around the peripheral edges of the valve when open. A slot 76 in the valve-stem guide provides for the passage of gas through the guide and a similar slot 77 in the plunger guide provides a passage for gas to a vertical conduit 78 to which the tubing 65 is connected.

The valve 68 is opened, to supply gas to the pressure chamber, by thrusting the plunger 71 to the right. This is done by means of a lever or cam 80 (Figs. 1 and 2) that has angular movement about a pivot 81. The cam 80 is moved by a stud 82 extending downward from the crank 19. Fig. 2 shows the relative position of stud 82 and cam 80 when the tester is not in operation. The crank 19 is held in a retracted position by a latch 83 that catches in a groove 84 in the top face of the crank 19. The latch 83 also serves as a switch element, and when in contact with the crank 19 grounds the magneto or otherwise prevents power from being supplied to the contact button 50. With the crank 19 in the retracted position, the stud 82 is in the full-line position shown in Fig. 2.

The cam 80 is held in the position shown in full lines in Fig. 2 by the spring pressure behind the plunger 71. When the crank 19 is moved clockwise to raise the spark-plug up against the pressure chamber in position to be tested, the stud 82 is shifted into the dotted-line position shown in Fig. 2 and this movement of the stud 82 shifts the cam 80 into the dotted-line position shown, and moves the plunger 71 back enough to open the valve in the casing 66.

When the valve in the casing 66 is open, gas flows from the hose 67, through the casing 66, tubing 65, and fitting 63 to the pressure chamber within the housing 35. The cam 80 is so shaped and so located that it opens the valve in the desired sequence with the operation of the cam 22 in raising the spark-plug into position to be tested, that is, the gas is not supplied to the pressure chamber until the spark-plug has been forced against the rubber facing on the under side of the housing 35 with sufficient force to prevent leakage of gas from the chamber. Particularly when using carbon dioxide, it is important to avoid leakage of gas from the chamber because the carbon dioxide is purchased in storage cylinders and any waste of gas reduces the number of plugs that can be tested with each cylinder and increases the cost of the testing.

When a spark-plug of a given type is to be tested the first step is the selection of the correct adapter for that size and type of plug. The adapter 29 is placed on the platform 28 and held in position on the platform by studs already described. The adapter 29 and platform 28 together comprise the spark-plug holder of the tester. The plug is inserted sideways into the open-ended slots in the holder with the flange of the plug just above the top face of the adapter. The plug is moved in to the end of the slot in the adapter and then left with its flange resting on the adapter which holds the spark-plug in substantial alinement with the opening in the bottom of the pressure chamber. The button 50 and its supporting structure are depressed against the spring 61 while the spark-plug is being put in position. The button 50 is allowed to move up into contact with the plug after the plug is properly positioned, and the spring 61 is not strong enough to lift the plug.

With the spark-plug thus positioned in the holder and connected with a power source through contact with the button 50, the operator grips a handle 86 at the end of the crank 19 which is the actuator of the tester and moves the crank clockwise. This movement of the crank 19 turns the hub 20 and the cam 22 at the upper end of the hub causes the platform 28 to rise and bring the spark-plug up against the rubber facing 46 as shown in Fig. 3. Further rising movement of the platform 28, as the crank is moved to its limit of travel, causes the spark-plug to compress the resilient rubber facing 46. The force with which the plug is held against the rubber facing 46 can be controlled by loosening the screws 37 and shifting the clamp 36 up or down on the post 11. The angular movement of the crank 19 is limited by a stud 88 that extends upward from the support 16 and into the path of abutments on the under side of the crank 19.

The initial movement of the crank 19 shifts it away from the latch 83 which is connected with the magneto and grounds the magneto through the crank 19 and base 10 of the tester. Breaking of this ground connection causes high tension power to be supplied through the wire 52 to the button 50 in contact with the spark-plug terminal. The spark-plug operates, if not defective, and the flashes of the sparks are observed through the window 42.

The final movement of the crank 19 causes the stud 82 to move the cam or lever 80 and push back the plunger 71 so that the valve in the valve casing 66 is opened and gas under pressure is supplied to the pressure chamber in which the spark-plug electrodes are operating. The gauge 64 indicates the pressure in the chamber.

As soon as the operator observes whether the spark-plug still operates after the pressure in the chamber has risen to a predetermined test pressure, the crank 19 is shifted back to its original position where it is held by the latch 83.

The initial backward (counter-clockwise) movement of the crank 19 causes the valve in the valve casing 66 to close and the final movement that brings the crank into contact with the latch 83 grounds the magneto and cuts off the supply of power to the spark-plug.

The pressure of the gas urges the spark-plug downward, but after the plug moves away from the rubber facing 46, the combined weight of the plug, adapter, platform 28, and hub 24 is more than enough to cause these parts to descend when the cam 22 is turned back by the crank 19.

The preferred embodiment of the invention has been described, but changes and modifications can be made and some features of the invention can be used without others. Terms of orientation are, of course, relative, though it is an advantage to have the plug rest by gravity on the holder.

I claim:

1. A spark-plug tester including a base, a post extending upward from the base, a spark-plug holder movable up and down on the post, a pressure chamber with an opening in its bottom wall in line with a spark-plug carried by said holder, and a device for moving the holder into position where the electrode end of an inverted spark-plug on the holder is exposed to the pressure in the chamber.

2. A spark-plug tester including a base, a post extending upward from the base, a spark-plug holder movable up and down on the post, a pressure chamber with an opening in its bottom wall, an adapter associated with said holder for supporting a particular spark-plug in a position of alinement with the chamber opening when the holder moves upward on the post, and a spring-pressed contact in position to touch the terminal of the spark-plug supported by said adapter.

3. Apparatus for testing spark-plugs including in combination a base, a post extending upward from the base, a housing attached to the upper end of the post, a pressure chamber in the housing with an opening in its bottom wall at one side of the post, a transparent window in the upper wall of the chamber, a spark-plug holder movable up and down on the post, means for maintaining an inverted spark-plug in a position of alinement with said opening, and means for causing the holder to move up and down on the post.

4. In a spark-plug tester including a base and a post that extends upward from the base, a spark-plug holder that slides up and down on the post and is held against rotation by a key and slot, one of which is in the base and the other in the holder, a rotatable hub on the post, a crank for oscillating the rotatable hub, a cam connected to the hub in position to raise the spark-plug holder in response to angular movement of the hub by said crank, and a pressure chamber above the spark-plug holder.

5. A spark-plug tester including in combination a base, a post extending upward from the base, a crank, a hub at the inner end of the crank angularly movable on the lower part of the post as a bearing and supported by a thrust bearing surface on the base, a handle at the end of the crank, a cam at the upper end of the crank hub, a spark-plug holder including a platform and a hub portion that fits the post immediately above the crank hub and that has an inclined surface resting on the cam of the crank hub, one or more keys in the post extending into keyways in the hub portion of the spark-plug holder for preventing rotation of the spark-plug holder on the post while leaving said holder free to slide up and down on the post, a housing in which is a pressure chamber with an opening in its bottom wall, a resilient facing over the outside of the bottom wall of the housing around said opening, an adapter on the platform for holding an inverted spark-plug in such position that the end of the spark-plug comes against the resilient facing when the cam surface of the crank hub is turned to move the spark-plug holder upward on the post, a clamp connected to the housing and clamped on the post to locate the pressure chamber at the desired position with respect to the spark-plug holder, a guide connected to the base and in axial alinement with the chamber opening, a plunger movable in the guide, and a spring urging said plunger upward into contact with the terminal of a spark-plug in said holder.

6. Apparatus for testing a spark-plug including a spark-plug holder, a pressure chamber, means for moving the holder and a spark-plug on the holder toward and from the pressure chamber, a conductor through which high tension electricity is supplied to a spark-plug carried by the holder, and a switch element for controlling the supply of electricity to said conductor, said switch element being operated by the means for moving the holder.

7. Apparatus for testing a spark-plug including a spark-plug holder, a pressure chamber, means for moving the holder and a spark-plug on the holder toward and from the pressure chamber, a conduit through which gas is supplied to the pressure chamber, a valve commanding the conduit, and a valve-opening device operated by the means for moving the spark-plug holder.

8. In a spark-plug tester having a pressure chamber and an opening through a wall of the chamber, a conduit through which gas is supplied to the pressure chamber, a valve commanding the conduit, a spark-plug holder with means for holding a spark-plug in a definite position on the holder, apparatus for moving the holder and plug as a unit into position to expose the electrode end of the plug to the pressure of gas within the chamber, a conductor for supplying high-tension electricity to a spark-plug carried by the holder, a switch element controlling the supply of electricity to the conductor and operated by the apparatus for moving the holder, and a device for opening the valve operated by said apparatus.

9. A spark-plug testing apparatus comprising a pressure chamber, a holder for moving a spark-plug into and out of position exposed to the pressure in the chamber, a valve for controlling the supply of gas to the pressure chamber, and a common actuator operatively connected with both the holder and valve, said actuator being constructed and arranged to operate the holder and valve in sequence.

10. In a spark-plug tester, a pressure chamber with an opening through which the electrode end of a spark-plug can be exposed to the pressure in the chamber, a spark-plug support, means on said support for holding a spark-plug in line with said opening, and mechanism including a cam operable to cause said support to move toward or from the pressure chamber.

11. A spark-plug tester including a chamber with a wall having an opening through which the electrodes of a spark-plug are exposed to the pressure in the chamber when the end of the spark-plug is held against the outside of said wall in line with said opening, a spark-plug holder for moving a spark-plug toward and against said wall, means for supplying gas under pressure to the chamber including a valve, means for supplying high tension electricity to a spark-plug in said holder including a switch element, an actuator for the spark-plug holder, and mechanical connections between the actuator and the valve and switch element for supplying gas to the chamber and electricity to the spark-plug when the actuator moves the spark-plug into position for testing.

12. A spark-plug tester including a chamber with a wall having an opening through which the electrodes of a spark-plug are exposed to the pressure in the chamber when the end of the spark-plug is held against the outside of said wall in line with said opening, a spark-plug holder, mechanism including a manually-actuated crank for moving the spark-plug holder toward and from the chamber to bring a spark-plug on said holder against said wall, a valve for controlling the gas pressure within the chamber, and a switch element for controlling the power supply to a spark-plug on the holder, the operation of said valve and switch element being controlled by said manually-actuated crank.

CHRISTOPHER A. SCHULZ.